United States Patent [19]

Jones

[11] 3,950,463
[45] Apr. 13, 1976

[54] PRODUCTION OF β-ALUMINA CERAMIC TUBES

[75] Inventor: Ivor Wynn Jones, Chester, England

[73] Assignee: The Electricity Council, London, England

[22] Filed: May 9, 1972

[21] Appl. No.: 251,675

Related U.S. Application Data

[63] Continuation-in-part of Ser. No. 82,718, Oct. 21, 1970, abandoned.

[30] Foreign Application Priority Data

Oct. 22, 1969  United Kingdom............... 51780/69

[52] U.S. Cl. ..................... 264/57; 136/153; 264/66
[51] Int. Cl.² .......................................... F27B 9/14
[58] Field of Search .......... 264/57, 66, 332; 106/65; 136/153

[56] References Cited

UNITED STATES PATENTS

| | | | |
|---|---|---|---|
| 1,138,674 | 5/1915 | Little et al. .......................... | 264/57 |
| 2,968,551 | 2/1961 | North et al. ....................... | 264/57 X |
| 3,446,677 | 5/1969 | Tennenhouse..................... | 106/65 X |
| 3,468,719 | 9/1969 | Tennenhouse..................... | 106/65 X |
| 3,475,225 | 10/1969 | Tennenhouse..................... | 106/65 X |
| 3,533,143 | 10/1970 | Varga .............................. | 264/57 X |
| 3,625,773 | 12/1971 | Charles............................. | 136/153 |

Primary Examiner—Robert F. White
Assistant Examiner—Thomas P. Pavelko
Attorney, Agent, or Firm—Beveridge, DeGrandi, Kline & Lunsford

[57] ABSTRACT

Tubes of β alumina ceramic are produced by forming a tube of compressed finely divided powder material, e.g. finely divided crystalline β alumina or finely divided powders which together will form on heating the required ceramic. This tube is passed at a uniform rate through an electric inductive furnace of open-ended tubular form having a short zone at 1600°–1900°C so that the tube is rapidly raised to the sintering temperature and, after a short period in the sintering zone is rapidly cooled.

8 Claims, 1 Drawing Figure

U.S. Patent April 13, 1976 3,950,463
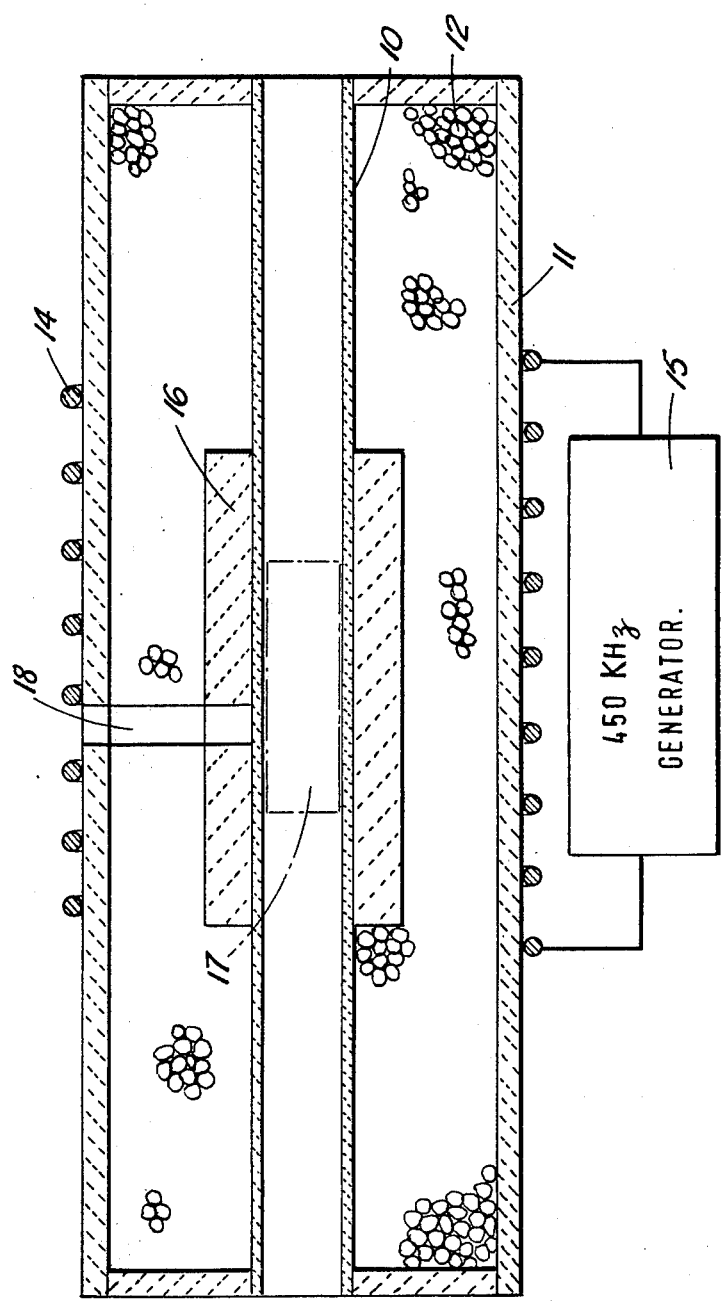
INVENTOR
IVOR WYNN JONES

PRODUCTION OF β-ALUMINA CERAMIC TUBES

RELATED APPLICATION

This application is a continuation-in-part of my copending application No. 82,718 filed Oct. 21st 1970, now abandoned.

BACKGROUND OF THE INVENTION

1. Field of the Invention

This invention relates to the production of tubes of β alumina ceramic.

β alumina ceramic is a material having a nominal composition by weight of 5% $Na_2O$, 95% $Al_2O_3$. The amount of sodium oxide in practice can range from 5 up to 10%. Up to 5% of magnesium oxide or lithium oxide may also be included in addition to the sodium oxide. The present invention is concerned more particularly with the production of long thin walled tubes of this material. Such tubes are required for use as a solid electrolyte in certain types of cells, e.g. sodium sulphur cells and for the electrochemical recovery of sodium from solution in other metals. The tubes must be impervious to helium and have a density which closely approaches the theoretical single crystal value. The tubes for use as an electrolyte must also have the composition closely controlled right up to the surface of the material.

2. Description of the prior art

In making a tube of β alumina ceramic by conventional firing processes, sintering temperatures in the range of 1600° to 1900°C are required but they would have to be very closely controlled, for example to ± 10°C, over the whole length of the tube to obtain optimum properties. Such fine control for long tubes would normally require a very slow heating stage. In the course of heating up to the sintering temperature the material therefore spends long periods of time at lower temperatures. Under these conditions processes occur which degrade its surface energy in such a way that it is not available for sintering when the required temperature has been reached. This results in production of material of moderate density even when very fine starting materials are used. Furthermore the material contains a volatile constituent ($Na_2O$) which can be lost during an extended firing, leading to a loss of control of the overall composition and to the existence of composition gradients within a given material.

It is well known that the rate processes which cause grain growth and sintering in ceramic materials increase exponentially with temperature. For a β alumina ceramic tube for use as an electrolyte in a sodium sulphur cell, it has been found that detrimental changes in crystalline structure occur using a conventional sintering process as described above with sintering in the range of 1600°–1900°C. In U.S. Pat. Nos. 3,468,719 and 3,475,225 of Tennenhouse, it has therefore been proposed to effect the sintering at a temperature between the minimum sintering temperature and an upper temperature of 1550°C (or of 1650°C in the presence of conversion inhibiting amounts of extraneous sodium ion). The sintering time is prolonged (2–18 hours depending on the temperature).

SUMMARY OF THE INVENTION

It is an object of the present invention to provide an improved method of producing tubes of β alumina ceramic obviating or reducing these difficulties and more particularly to produce tubes of β alumina ceramic of significantly higher density than has heretofore been possible to obtain.

According to this invention, a method of producing a tube of β alumina ceramic comprises the steps of forming a tube of compressed powder of the required composition and then moving this tube through a furnace so that a short length of the tube is raised to the sintering temperature, the tube being continuously moved so that the heated zone is gradually moved along the length of the tube.

The compressed powder may, in accordance with known techniques for the production of β alumina ceramic, be homogeneous and composed of the final β alumina ceramic in finely divided crystalline form or it may be a mixture of the oxides in the required proportions or may be a mixture of α alumina and compounds of sodium (e.g. sodium aluminate) and of magnesium (e.g. magnesium oxide) and/or lithium (e.g. lithium carbonate) which together will form on heating the required ceramic composition. In the latter case the sintering includes the chemical reaction to form the required homogeneous chemical and crystal structure.

The furnace has a temperature profile, i.e. relationship between temperature and position along the length of the furnace, in which the temperature increases from one end to a maximum temperature between 1600° and 1900°C and then decreases towards the other end. The length $l$ of the sintering zone, which is the region within 10°C of the maximum temperature in the furnace, and the velocity $v$ at which the tube is traversed are such that the time $l/v$ during which any point on the tube is in the sintering zone is between 12 seconds and 2 minutes. Furthermore, the temperature profile and the rate of traverse of the tube are such that a point in the tube is heated up to the sintering temperature and cooled from the sintering temperature at a rate between 200°C per minute and 2400°C per minute.

With this method, a very short sintering and heating time is employed whilst still maintaining the required close control of temperature. The heating time depends on the length of the furnace and on the rate at which the tube is passed through the furnace. It is possible therefore to use a very short furnace, shorter than the length of the tubes to be produced. More particularly however very long lengths of tube can readily be made with a small furnace. Independently of the length of the sintering zone in the furnace, the time in that zone can be controlled by controlling the rate of movement of the tube through the furnace. The zone sintering process can be readily controlled so that the final grain size is very close to that of the original powder particles. Grain size in the preferred dense ceramic can be kept as low as 1 to $2\mu^m$ because of the rapid heating and cooling and short exposure to sintering temperature that is possible with the method of the present invention.

Alternatively, using different conditions recrystallisation phenomena can be controlled to produce grain sizes intermediate between $1\mu m$ and $20$–$50\mu m$. ($20$–$50\mu m$ is the grain size of completely recrystallised zone sintered material).

As previously indicated, the rate processes which cause sintering increase exponentially with temperature. In the method of the present invention, the maximum temperature in the furnace is made between 1600° and 1900°C; whatever temperature is chosen, the region in the furnace within 10°C of the maximum temperature is referred to as the sintering zone since it is the region at or near the maximum temperature which is of importance for sintering and which will largely determine the grain growth. The duration of sintering is therefore defined as the length $l$ of the zone where the temperature is within 10°C of the maximum divided by the traverse speed. In the present invention, this time is very short compared with the many hours used in prior techniques. The calculation $l/v$ tends to over estimate the duration of sintering at high traverse speeds through short hot zones, because the finite thermal mass of the tube and its finite thermal conductivity cause its time-temperature profile to lag behind the static temperature profile of the furnace.

Conveniently an inductively heated tube furnace is employed. This may have an overall length shorter than the length of the ceramic tube to be sintered. The zone at the sintering temperature may, for example have a length not more than four times and typically only twice the diameter of the furnace bore through which the tube is passed. The sintering zone may be maintained at a temperature between 1600° and 1900°C, typically at 1700°C, and each portion of the tube may typically remain in the sintering zone for a time of less than 2 minutes. By using a high speed of traverse, the time may be very much shorter than this and tubes of high density have been made with a time in the sintering zone as short as 12 seconds.

With such a construction having a short sintering zone, it is possible to control the sintering zone temperature closely to a required value. It may readily be controlled to ± 10°C.

By the technique described above, as will be seen from the examples given below, it is possible to produce tubes of $\beta$ alumina ceramic with a bulk density of 3.1 to 3.2 gram per cc. This is significantly higher than has previously been obtainable. It is readily possible, using the present invention, to obtain densities some 4 to 5% higher than the highest values previously known. For a solid electrolyte, open porosity must be totally eliminated from the material during the sintering process in order that the electrolyte should be impervious to metallic sodium and elemental or ionic sulphur. This requires that the density must closely approach the theoretical maximum density.

With the method of the present invention, this very high density is combined with the achievement of fine grain size. These two factors result in a material of high strength and high physical integrity.

It is an important feature of the present invention that the material is rapidly heated to the sintering temperature and rapidly cooled. In other words, the length of the heating zone of the furnace before the sintering region must be left sufficiently short; this does not present any practical difficulty. The heating rate is made at least 200°C per minute. The upper limit is not critical but, in practice, it has been found that there is a slight falling off in ceramic properties at the highest traverse speeds. The maximum traverse speed investigated was over 200 mm per minute, which in the particular furnace used, gave a heating rate of 2400°C per minute and hence a temperature gradient of 12°C per mm in the tube. At this speed, the material obtained was of higher density than material produced by prior known techniques.

BRIEF DESCRIPTION OF THE DRAWING

The accompanying drawing illustrates diagrammatically the construction of a furnace for the sintering of long $\beta$ alumina ceramic tubes.

DESCRIPTION OF THE PREFERRED EMBODIMENT

The following is a description of one method of production of $\beta$ alumina ceramic tubes.

The tubes produced by this method were 18 inches long and 0.5 inches external diamter. Longer tubes can readily be made using the same furnace. However for comparative measurement of the properties of the material shorter tubes were made as specified below. Mixed finely divided powder material of the required composition was put on a steel mandrel of the required internal diameter to form a tube of the required composition by isostatic compression using hydraulic pressure in a flexible sleeve. The resultant compressed powder tube was removed from the mandrel, the compression being sufficient to cause the particles to adhere sufficiently for handling. The tube was then sintered. This sintering process was carried out in an inductively heated tube furnace about 1 foot long having a heating tube of 1 inch bore. The sintering zone in this tube was about 2½ inches long and was maintained at a sintering temperature typically of 1700°C, the temperature being controlled to ± 10°C. The exampls given below include tubes made at differing sintering temperatures. Less than 8 inches of the furnace was above 1,000°C. The tube was passed through the furnace at a controlled rate of about 1 inch per minute so that the sintering time was less than 2 minutes and the heating rate up to the sintering temperature was greater than 200°C per minute. Heating rates and cooling rates up to about 2400°C per minute have been successfully employed.

The rapid heating, short firing time and rapid cooling of this zone sintering technique was found to give tubes having a very good performance for example as a solid electrolyte in sodium sulphur cells and for the electrochemical recovery of sodium for solution in other metals. The material is impervious to helium and has a closed porosity of only 3 to 5%.

Using the above described method, $\beta$ alumina ceramic tubes have been produced of a material having a bulk resistivity in the range 3–15 ohm. cm, density in the range 3.1 to 3.2 gm.cm$^{-3}$, and fine grain size. The tubes produced had a mass per unit length of between 1 and 3 gms. per cm. Measurements on a number of examples are detailed below. Such tubes have been used as an electrolyte in a sodium sulphur cell; an electrolyte of 100 cm$^2$ area has operated continuously for over 1500 hours, involving 150 charge-discharge cycles and the current passage of approximately 6000 amp. hours. Long life times have also been obtained using such tubes in sodium recovery cells.

One construction of furnace for the sintering of long $\beta$ alumina ceramic tubes is illustrated in the accompanying drawing. Referring to this drawing, there is shown as inner recrystallised alumina tube 10 of 1 inch internal diameter surrounded by an outer quartz tube 11 of 4 inches external diameter filled with bubbled alumina insulation 12. Around the tube 11 intermediate the ends thereof is a helical coil shown diagrammatically at 14 and connected to a 450 kH$_z$ generator 15. A cylindrical graphite susceptor 16 immediately around the inner tube 10 within the coil ensures a limited hot zone, indicated by chain lines at 17, which typically, in a 12 inch long furnace, is 1 inch diameter. A viewing port 18 is provided for temperature measurement.

The following are details of more specific examples of the production of the tubes.

EXAMPLE 1

Preparation of Powder Compact for Zone-sintering

The following quantities of the following commercially available materials were weighed out: (1) 1620 gms of ground alumina, having a median particle size of less than 1 micron; (2) 371.2 gms of anhydrous sodium aluminate of unspecified particle size, and (3) 40 gms of MgO of unspecified particle size. These were placed in a rubber-lined vibroenergy mill which contained 10 kg of pure alumina grinding media. The grinding media were solid cylinders 12 mm long × 12 mm dia. The mixture was then milled for a period of 48 hours, and then the powder was separated from the grinding media using a 10 mesh sieve.

Tubular samples were then fabricated in an isostatic pressure mould. The mould consisted of a half inch diameter silver steel mandrel, centrally positioned in a ¾ inch i.d. p.v.c. rubber tube. The p.v.c. tube was contained in a perforated metal tube so that the annulus between the mandrel and the p.v.c. tube is actually a cylinder of uniform wall thickness. This annulus was filled with powder prepared as described above. The powder was then compacted into a uniform walled cylinder when the mould was subjected to a pressure of 40,000 p.s.i. in a pressure vessel. The mandrel was tapered slightly (0.001 inch per inch) to facilitate removal of the pressed compact from the mandrel.

The samples produced for these experiments were 150 mm long. However, the zone sintering principle is independent of the length of the samples. Samples up to 500 mm in length have been moulded and sintered. The cross-sectional area of the sintered tubes described in the examples all fall in the range 0.6–0.8cm$^2$, and usually fall in the range 0.65–0.75 cm$^2$. Since the sintered density falls in the range 3.1 ± 0.1 gm cc$^{-1}$ for all of the samples, the mass per unit length is specified quite closely for all these tubes.

The samples were all dried for various periods as indicated in Table 1 below, prior to zone sintering. The samples were passed through the furnace individually using 3 mm o.d. alumina push rods. The push rods were about 500 mm long, and therefore the samples could be pushed through the furnace in a continuous movement at a uniform speed. The thermal mass and cross-sectional area of the push rod were restricted in this way to prevent interaction of the push rod with the zone sintering conditions. However, for continuous production of tubes, a push rod is not required until the run is terminated.

The inductively heated furnace described above was used. Specific details were as follows: The overall length of the furnace was 12 inches; the cylindrical susceptor was machined out of graphite and was 8 inches long and 2¼ inches in diameter; the furnace tube had an i.d. of approximately 1 inch and was composed of recrystallised alpha alumina. The furnace was then heated inductively until the temperature at the centre of the hot zone was 1740°C. This temperature was measured by positioning a recrystallized alumina crucible in the centre of the furnace tube, and measuring its temperature with a disappearing filament radiation pyrometer. The temperature through the hot zone was then measured by advancing the crucible through the hot zone.

The temperatures at 1 cm intervals are recorded below:

1450°, 1525°, 1575°, 1620°, 1645°, 1675°, 1695°, 1710°, 1720°, 1735°, 1740°, 1740°, 1740°, 1735°, 1725°, 1715°1705°, 1690°, 1675°, 1655°, 1630°, 1590°, 1545°, 1500°, 1445°centigrade.

This static temperature profile was maintained by fixing the powder input to the furnace. With such a temperature profile, the heating and cooling rates are substantially sintered. The results obtained by zone-sintering through this temperature profile are collected in Table 1.

The maximum temperature achieved by the sample was measured in the following way. The tubular samples had one end closed (this is easily achieved in isostatic moulding by making the mandrel slightly shorter than the mould). The samples were then passed through the furnace closed end first. A disappearing filament pyrometer was focussed on the closed end as it passed through, and the maximum temperature was recorded. It must be remembered, therefore, that this maximum temperature only refers to the front end of the sample. It was noticed that very rapid traverse speeds caused significant cooling of the furnace wall. However, it can be seen that the maximum temperature corresponds closely to the maximum of the static temperature profile recorded before the run. The linear shrinkage was computed from the entry and exit lengths of the samples. Bulk densities were measured by the usual archimedian method. The tensile strength was determined by the brittle ring test. The strength result is the mean of the values obtained for four sections of each sample.

It can be seen that the bulk density increases smoothly up to a maximum at a traverse rate of 50 mm per minute and then falls off rapidly although it is still high compared with values commonly obtained using prior known techniques. The tensile strength also increases smoothly as the speed is increased from 5 to 50 mm per min.

EXAMPLE 2

For production of zone sintered electrolyte at a maximum temperature of 1770°–1780°C, the results are recorded in Table II.

For this example the samples were prepared from the same powder used in Example 1, and moulded in exactly the same way. However, the temperature profile of the furnace was raised as follows. A closed end crucible was placed at the centre of the hot zone and the temperature increased to 1770°C by increasing the input power. This power input was then maintained constant at the new value. The exact static profile through the hot zone was not remeasured for this example. The general shape is very similar to that of the previous example.

It can be seen that the same general trends are present in the results of Table II, as were observed in Example 1. However, the desirable properties of high bulk densities and high mechanical strength now persist at higher traverse speeds.

EXAMPLE 3

In this example the material was moulded and sintered exactly as described for the two previous examples. However, the maximum static temperature of the furnace was now raised to 1820°, which was maintained by controlling the power input. The results are recorded in Table III. The maximum density now occurs at rates of 133 and 146 mm per minute.

No strength determinations were made for the speeds of 102, 133 and 136 mm per minute. However, the tensile strength was measured for the rate of 204 mm per min. It is very significant that it is greater than the strength achieved at 50 mm per min., even though the bulk density is greater in the latter case.

The heating rate was estimated from the length of the heating zone, i.e. 150 mm, which is half of the length of the furnace in the examples, the recorded maximum temperature for the sample and the rate of movement. The average temperature gradient for sintering temperatures over 1500°C is therefore at least 10°C per mm. Therefore the heating rate is estimated to be 10 V deg C per min., where V mm per min. is the traverse rate. All but one sample in the examples were produced at rates of over 20 mm per minute, and this gives a heating rate of 200°C per min. when substituted in the equation above. Actually, it can be seen that the ceramic properties, e.g. bulk density and tensile strength increase when the heating rate is increased above this value.

The maximum traverse rate investigated was 204 mm per minute when the peak temperature was 1800°C. indicates an average heating rate of 2400°C per min. The ceramic properties are beginning to deteriorate at this rate but it will be noted that the density is still high compared with that obtained by prior known techniques.

It can be deduced from the temperature versus distance profile which was set for the above in Example 1 that each portion of the sample spends only a short time at the maximum temperature and that the sample is heated and cooled rapidly. This is important because the rate processes which cause grain growth and sintering in ceramic materials increase exponentionally with temperature. Therefore, the time at the maximum temperature is very important. The duration of sintering has been defined as length of the hot zone divided by the traverse speed, where the length of the hot zone is the furnace length for which the temperature falls in the range $T_{max}$ to $T_{max} - 10°C$. In the case of the example the hot zone length is 50 mm. Therefore the duration of sintering for a traverse rate of 20 mm per minute is 2.5 minutes. This calculation tends to overestimate the duration of sintering at high traverse speeds through short hot zones, because the finite thermal mass of the tube and its finite thermal conductivity cause its time temperature profile to lag behind the static profile in the furnace.

Conveniently the furnace has a susceptor length in the range 2 to 8 inches and an overall furnace length of 12 inches. A longer furnace of the same diameter can be employed if the traverse speed is scaled up in proportion to the length.

TABLE I

Zone sintering at a maximum temperature of 1740–1750°C

| Sample No. | Drying Schedule | Rate of Traverse mm/min. | Max.Temp. reached by sample °C | Linear Shrinkage % | Bulk Density gm cc$^{-1}$ | Tensile Strength N/mm$^2$ |
|---|---|---|---|---|---|---|
| 29a-7 | 5 mins at 200°C | 5 | 1750 | 10.2 | 3.149 | 154 |
| 29a-8 | 17 hrs at 200°C | 23 | 1750 | 11.6 | 3.188 | 207 |
| 29a-17 | 50 mins at 200°C | 36 | 1740 | 12.4 | 3.198 | 236 |
| 29a-13 | 35 mins at 200°C | 50 | 1740 | 13.1 | 3.204 | 266 |
| 29a-15 | 45 mins at 200°C | 50 | 1740 | 12.4 | 3.199 | 255 |
| 29a-10 | 17 hrs at 200°C | 74 | 1740 | 11.7 | 3.182 | |
| 292-11 | 2 hrs at 200°C | 146 | 1740 | 10.2 | 3.045 | |

TABLE II

Zone sintering at a maximum temperature of 1770–1780°C

| Sample No. | Drying Schedule | Rate of Traverse mm/min. | Max.Temp. reached by sample °C | Linear Shrinkage % | Bulk Density gm cc$^{-1}$ | Tensile Strength N/mm$^2$ |
|---|---|---|---|---|---|---|
| 29a-27 | 40 mins at 200°C | 25 | 1780 | 10.3 | 3.182 | 142 |
| 29a-23 | 15 mins at 200°C | 36 | 1770 | 12.4 | 3.202 | 195 |
| 29a-29 | 10 mins at 200°C | 50 | 1770 | 11.8 | 3.212 | 211 |
| 29a-25 | 25 mins at 200°C | 74 | 1770 | 12.2 | 3.208 | 232 |
| 29a-28 | 5 mins at 200°C | 102 | 1770 | 11.3 | 3.195 | 269 |

Here the temperature gradient is 12°C per mm which

TABLE III

Zone sintering at a maximum temperature of 1820–1830°C

| Sample No. | Drying Schedule | Rate of Traverse mm/min. | Max.Temp. reached by sample °C | Linear Shrinkage % | Bulk Density gm cc$^{-1}$ | Tensile Strength N/mm$^2$ |
|---|---|---|---|---|---|---|
| 29a-32 | 15 mins at 200°C | 50 | 1830 | 12.5 | 3.165 | 142 |
| 29a-36 | 1 hr at 200°C | 74 | 1830 | 11.0 | 3.166 | 150 |
| 29a-31 | 15 mins at 200°C | 102 | 1830 | 11.8 | 3.180 | |
| 29a-37 | 18 hrs at 200°C | 133 | 1830 | 10.9 | 3.202 | |
| 29a-33 | 20 mins at 200°C | 146 | 1820 | 12.0 | 3.209 | |

TABLE III-continued

| Sample No. | Drying Schedule | Zone sintering at a maximum temperature of 1820–1830°C | | | Bulk Density gm cc$^{-1}$ | Tensile Strength N/mm$^2$ |
| --- | --- | --- | --- | --- | --- | --- |
| | | Rate of Traverse mm/min. | Max.Temp. reached by sample °C | Linear Shrinkage % | | |
| 29a-34 | 45 mins at 200°C | 204 | 1825 | 10.9 | 3.128 | 235 |

I claim:

1. A method of producing a tube of $\beta$ alumina ceramic comprising the steps of compressing into the shape of a tube powdered $\beta$ alumina ceramic or a powdered mixture of materials which, on heating, produce a $\beta$ alumina ceramic and then traversing this tube in its axial direction at a uniform speed $v$ through a furnace having a temperature profile increasing in temperature from one end to a maximum sintering temperature between 1600°C and 1900°C and decreasing towards the other end, the length $l$ of the sintering zone which is within 10°C of the maximum temperature in the furnace and the velocity vr at which the tube is traversed being such that the time $l/vr$ during which any point on the tube is in the sintering zone is between 12 seconds and 2 minutes, the temperature profile of the furnace and the rate of traverse of the tube being such that a point on the tube is heated up to the sintering temperature and cooled from the sintering temperature at a rate between 200° C per minute and 2400°C per minute.

2. A method as claimed in claim 1 wherein the powdered mixture is formed of a mixture of 5 to 10% by weight of sodium oxide, 0–5% magnesium oxide or lithium oxide and the balance aluminium oxide.

3. A method as claimed in claim 1 wherein the powdered mixture is formed of $\alpha$ alumina and compounds of sodium and of magnesium and/or lithium which together will form on heating the required ceramic composition.

4. A method as claimed in claim 1 wherein the powder is formed of a mixture of $\alpha$ alumina, sodium aluminate, lithium carbonate and magnesium oxide.

5. A method as claimed in claim 1 wherein said maximum temperature is in the range 1740°–1750°C and wherein said tube has a mass per unit length of 1 to 3 gms per cm and wherein the speed of traverse is between 25 and 100 mm per minute.

6. A method as claimed in claim 1 wherein said maximum temperature is in the range 1770°–1780°C and wherein said tube has a mass per unit length of 1–3 gms per cm and wherein the speed of traverse is between 25 and 150 mm per minute.

7. A method as claimed in claim 1 wherein said maximum temperature is in the range 1820°–1830°C and wherein said tube has a mass per unit length of 1–3 gms per cm and wherein the speed of traverse is between 25 and 200 mm per minute.

8. A method as claimed in claim 1 wherein the furnace is cylindrical and has a diameter between one-fourth and one-half the length $l$ of the sintering zone.

* * * * *